(No Model.)

J. HARRINGTON.
VELOCIPEDE.

No. 359,863. Patented Mar. 22, 1887.

Witnesses
Fred L. Emery,
John F. C. Pinkert

Inventor
John Harrington,
by Crosby & Gregory, attys.

United States Patent Office.

JOHN HARRINGTON, OF COVENTRY, COUNTY OF WARWICK, ENGLAND, ASSIGNOR, BY MESNE ASSIGNMENTS, TO THE POPE MANUFACTURING COMPANY, OF PORTLAND, MAINE.

VELOCIPEDE.

SPECIFICATION forming part of Letters Patent No. 359,863, dated March 22, 1887.

Application filed May 18, 1886. Serial No. 202,544. (No model.)

*To all whom it may concern:*

Be it known that I, JOHN HARRINGTON, of Coventry, in the county of Warwick, England, have invented an Improvement in Velocipedes, of which the following description, in connection with the accompanying drawings, is a specification, like letters on the drawings representing like parts.

Prior to my invention it has been customary to connect the wheel-spanning fork of a velocipede with the stationary axle on which the small wheel revolves by two springs, one end of each spring being connected directly with the axle, and the other with one of the arms of the fork; but such connection has been found objectionable because the torsion on the springs when the velocipede is in use frequently causes the fork to touch the wheel.

To obviate the difficulty referred to and afford a connection between the fork and axle which shall not be subject to torsion, but shall be free to yield vertically for a sufficient amount to compensate for any shock to the vehicle in riding, I have connected each arm of the fork near its lower end and one end of the axle by means of two levers, or an extension thereof, and two spring-rods pivoted on the said axle, one end of each of the said spring-rods being connected to one end of one of the said levers, the other end of each of the said spring-rods being connected to one of the arms of the fork, the fork being thus supported by the said levers at one side of the axle.

My improved spring-rods and levers, constituting a connecting device between the fork and axle, are equally applicable for use in connection with the small wheels of tricyles.

My invention consists, essentially, in the combination, with a fork and the axle, of the wheel to be embraced by the said fork, of two levers and two spring-rods, to operate substantially as will be described.

Figure 1:
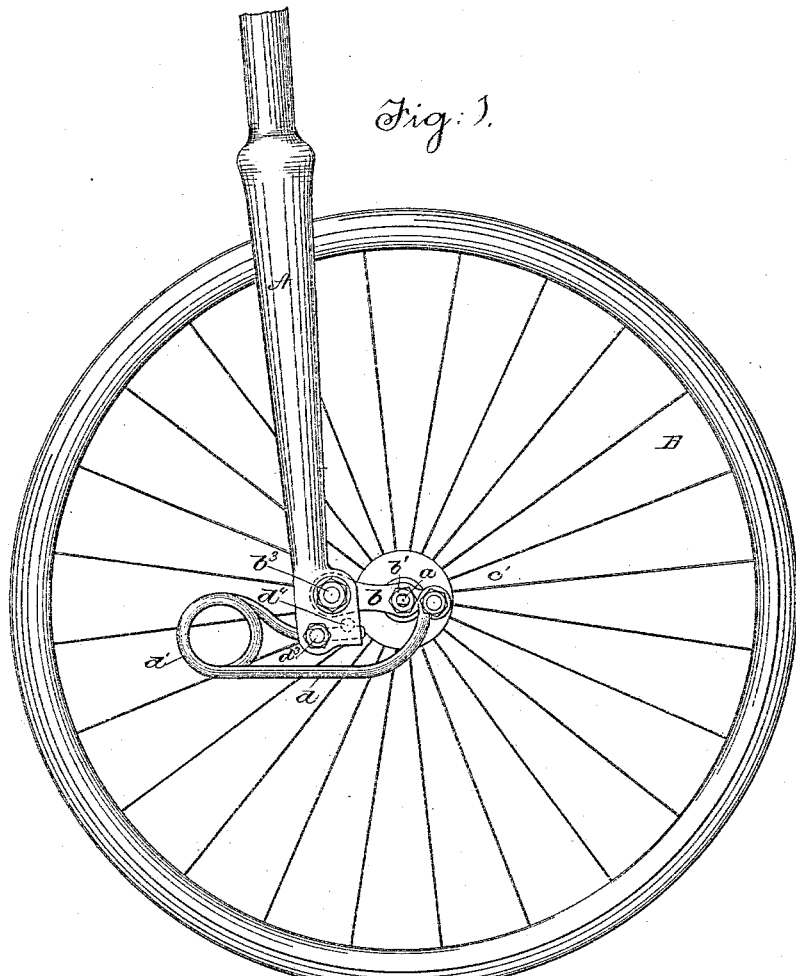
Figure 2:
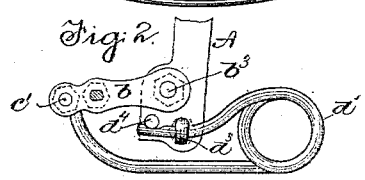
Figures 3, 4:
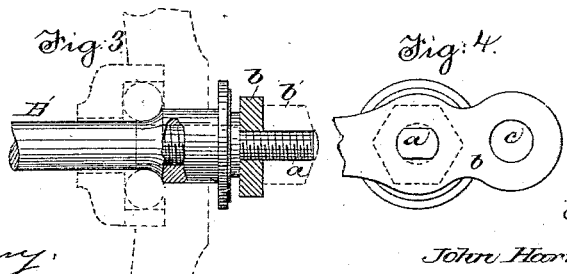

Figure 1, in side elevation, represents a sufficient portion of a velocipede to enable my invention to be understood; Fig. 2, a detail showing the inner side of one arm of the fork and a lever and spring-rod joining the fork and axle; Fig. 3, an enlarged detail showing part of the axle for the small wheel and the lever mounted thereon, in section, and Fig. 4 is an enlarged detail of part of the said lever.

The fork A, wheel B, and axle B' are and may be of any usual construction common in velocipedes. The axle B', stationary with relation to the fork A, has a screw-threaded portion, $a$, which, as shown best in Fig. 4, is slabbed at two places to receive upon it a lever, $b$, which is held in place thereon by a nut, $b'$, (shown by dotted lines in Figs. 3 and 4,) there being a like lever, $b$, at each side of the hub of the wheel and end of the axle. The long arm of each lever $b$ is connected to one arm of the fork by a bolt, $b^3$, the said lever so joining the said axle and the arms of the fork as to obviate any twisting or oscillation of the fork with relation to the wheel. The short arm of each lever $b$ is provided with a hole, $c$, to receive a bolt, $c'$, which is extended through a loop in or made to secure one end of the spring-rod $d$ to the said lever, the opposite end of the said spring-rod beyond the coil $d'$ therein entering a loop or eye, $d^2$, of a bolt extended through the fork, as shown.

The end of the spring-rod $d$ at the fork is made to co-operate with a stationary pin, $d^4$, (see Fig. 2,) the spring-rod being notched to engage the said pin.

The load carried by the fork is sustained by the lever $b$ and stiff steel spring-rod $d$, connected together and to the fork, as described, the said spring-rod and lever forming a reliable but easy spring-connection between the fork and axle.

I claim—

The fork and axle and wheel B, combined with levers $b$, connected to the fork and to the axle, or an extension thereof, and spring-rods $d'$, substantially as shown, connected to the said fork at its lower end and to the said levers near the said axle, to operate substantially as described.

In testimony whereof I have signed my name to this specification in the presence of two subscribing witnesses.

JOHN HARRINGTON.

Witnesses:
 GEO. W. GREGORY,
 F. CUTTER.